US012650150B2

(12) United States Patent
Linder et al.

(10) Patent No.: US 12,650,150 B2
(45) Date of Patent: Jun. 9, 2026

(54) SHAFT CONNECTOR SYSTEMS AND METHODS

(71) Applicant: AWC Frac Valves Inc., Conroe, TX (US)

(72) Inventors: Scott E. Linder, Montgomery, TX (US); Anthony J. Hanewinkel, Houston, TX (US)

(73) Assignee: AWC Frac Valves Inc., Conroe, TX (US)

( * ) Notice: Subject to any disclaimer, the term of this patent is extended or adjusted under 35 U.S.C. 154(b) by 0 days.

(21) Appl. No.: 18/594,579

(22) Filed: Mar. 4, 2024

(65) Prior Publication Data

US 2024/0200610 A1    Jun. 20, 2024

Related U.S. Application Data

(63) Continuation of application No. 17/166,674, filed on Feb. 3, 2021, now Pat. No. 11,920,637.

(60) Provisional application No. 62/969,355, filed on Feb. 3, 2020.

(51) Int. Cl.
*F16D 1/08* (2006.01)
*F16B 7/18* (2006.01)
*F16K 31/44* (2006.01)

(52) U.S. Cl.
CPC ............ *F16D 1/0847* (2013.01); *F16K 31/44* (2013.01); *F16B 7/182* (2013.01); *Y10T 403/5741* (2015.01)

(58) Field of Classification Search
CPC ...... F16B 7/0406; F16B 7/0426; F16B 21/12; F16B 21/125; F16B 21/14; F16B 21/18; F16B 21/186; F16D 1/04; F16D 1/0829; F16D 1/0835; F16K 31/44; Y10T 403/57; Y10T 403/5733; Y10T 403/5741; Y10T 403/66; Y10T 403/7064
See application file for complete search history.

(56) References Cited

U.S. PATENT DOCUMENTS

| | | | | |
|---|---|---|---|---|
| 1,809,404 A | * | 6/1931 | Culbertson | ............. F16D 1/076 411/316 |
| 2,417,195 A | * | 3/1947 | Hargreaves | .............. H02K 5/04 310/85 |
| 2,593,342 A | * | 4/1952 | Porter | ..................... F16B 21/18 403/316 |
| 2,609,220 A | * | 9/1952 | Spiclman | ................ F16B 21/18 403/46 |

(Continued)

FOREIGN PATENT DOCUMENTS

KR    20090105609 A  * 10/2009

*Primary Examiner* — Amber R Anderson
*Assistant Examiner* — Zachary A Hall
(74) *Attorney, Agent, or Firm* — Shannon W. Bates; Harper & Bates LLP

(57)    ABSTRACT

A method includes disposing a first shaft and a second shaft in an end to end arrangement, positioning a sleeve over the end to end arrangement, coupling the first shaft to the second shaft via the sleeve and a plurality of shear components that engage the sleeve and partially recess into the first shaft or the second shaft, retaining the plurality of shear components in the partially recessed position via one or more retaining mechanisms, and independently aligning the first shaft and the second shaft while transmitting torsional, translational, or torsional and translational loading through the plurality of shear components and not through the retaining mechanisms.

10 Claims, 18 Drawing Sheets

(56)  References Cited

U.S. PATENT DOCUMENTS 2,654,234 A * 10/1953 Christensen ............. F16D 3/38
                                                464/119
2,886,356 A * 5/1959 Firth ....................... F16B 21/18
                                                403/366
3,326,580 A * 6/1967 Munier ................. F16L 37/088
                                                403/243
3,480,309 A * 11/1969 Harris ..................... E04C 5/165
                                                403/313
3,603,624 A * 9/1971 Attermeyer ............. F16D 1/027
                                                403/300
4,217,061 A * 8/1980 Eiland ...................... F16D 1/04
                                                403/313
4,266,453 A * 5/1981 Farley ................. B25B 23/0035
                                                81/177.85
9,938,699 B2 * 4/2018 Kennedy .............. F16B 31/021

* cited by examiner

200

216

232

214

210

230

250

218

222

212

220

300

310

320

330

700

200, 700

2000

SHAFT CONNECTOR SYSTEMS AND METHODS

CROSS-REFERENCE TO RELATED APPLICATIONS

This application is a continuation of U.S. Non-Provisional patent application Ser. No. 17/166,674 filed Feb. 3, 2021 and entitled "Valve Features" at the time of filing (amended to "Shaft Connector Systems and Methods" during prosecution), which claims priority to, and the benefit of, U.S. Provisional Patent Application Ser. No. 62/969,355 filed Feb. 3, 2020, and entitled "Valve Features", the disclosures of which are incorporated herein by reference in their entireties for all purposes.

TECHNICAL FIELD

The present disclosure relates to stem connector assemblies, methods for connecting two shafts via a stem connector assembly, and valves that includes a stem connector assembly to connect a valve stem to an operator stem.

BACKGROUND

A valve may have a manual operator, a hydraulic operator, a pneumatic operator, an electric operator, or any other type of operator. After a valve has been installed in an operating environment, it may become necessary or desirable to remove the original operator and replace it with a different type of operator, such as replacing a manual operator with a hydraulic operator, for example. Traditional methods of installing a new operator may involve removing the valve from service, disassembling the valve, on-site match drilling of the valve stem and the operator stem, and pinning a traditional axially threaded connection between the valve stem and the operator stem. These traditional methods often involve operational downtime. In addition, the match drilling and pinning operation can reduce the strength of the valve stem and/or the operator stem, while increasing the torsional, translational, or torsional and translational loading on these stems.

SUMMARY

The present disclosure generally relates to methods for connecting two shafts via a stem connector assembly.

In some implementations, the method according to the present disclosure may comprise disposing a first shaft and a second shaft in an end to end arrangement, coupling the first shaft to the second shaft via a stem connector assembly, and independently aligning the first shaft and the second shaft while transmitting torsional, translational, or torsional and translational loading through the stem connector assembly.

In some implementations, the method according to the present disclosure may comprise disposing a first shaft and a second shaft in an end to end arrangement, positioning a sleeve over the end to end arrangement, coupling the sleeve to the first shaft and to the second shaft via a plurality of fasteners, and allowing the sleeve to self adjust the alignment between the first shaft and the second shaft while transmitting torsional, translational, or torsional and translational loading through the plurality of fasteners.

In some implementations, the method according to the present disclosure may comprise disposing a first shaft and a second shaft in an end to end arrangement, positioning a sleeve over the end to end arrangement, coupling the first shaft to the second shaft via the sleeve and a plurality of shear components that engage the sleeve and partially recess into the first shaft or the second shaft, retaining the plurality of shear components in the partially recessed position via one or more retaining mechanisms, and independently aligning the first shaft and the second shaft while transmitting torsional, translational, or torsional and translational loading through the plurality of shear components and not through the retaining mechanisms.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of the apparatus of the present disclosure and its features, reference is now made to the following description, taken in conjunction with the accompanying drawings, in which.

Like reference symbols in the various drawings indicate like elements.

DETAILED DESCRIPTION

The stem connection methods of the present disclosure comprise a process by which two independently aligned shafts are joined such that their individual alignments are separately maintained and bridged by a stem connector assembly. This connection provides for the transfer of torsional, translational, or torsional and translational, loading and forces.

In various implementations, the present disclosure is directed to stem connector assemblies, methods of coupling a first shaft and a second shaft via a stem connector assembly, and valves that employ a stem connector assembly to couple a valve stem to an operator stem.

Figure 1:
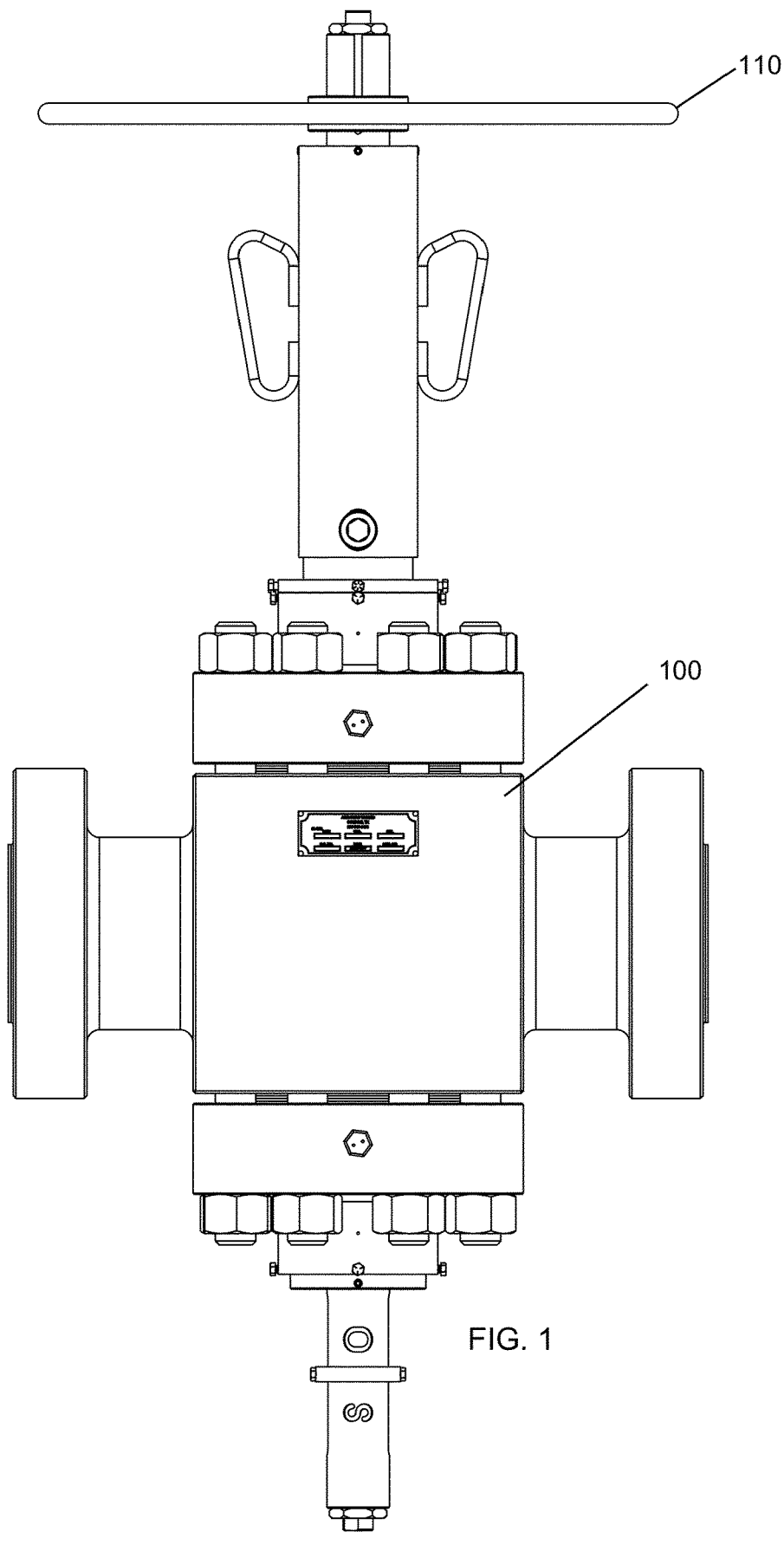
FIG. 1 depicts a plan view of a valve with a manual operator, according to the present disclosure.
Figure 2:
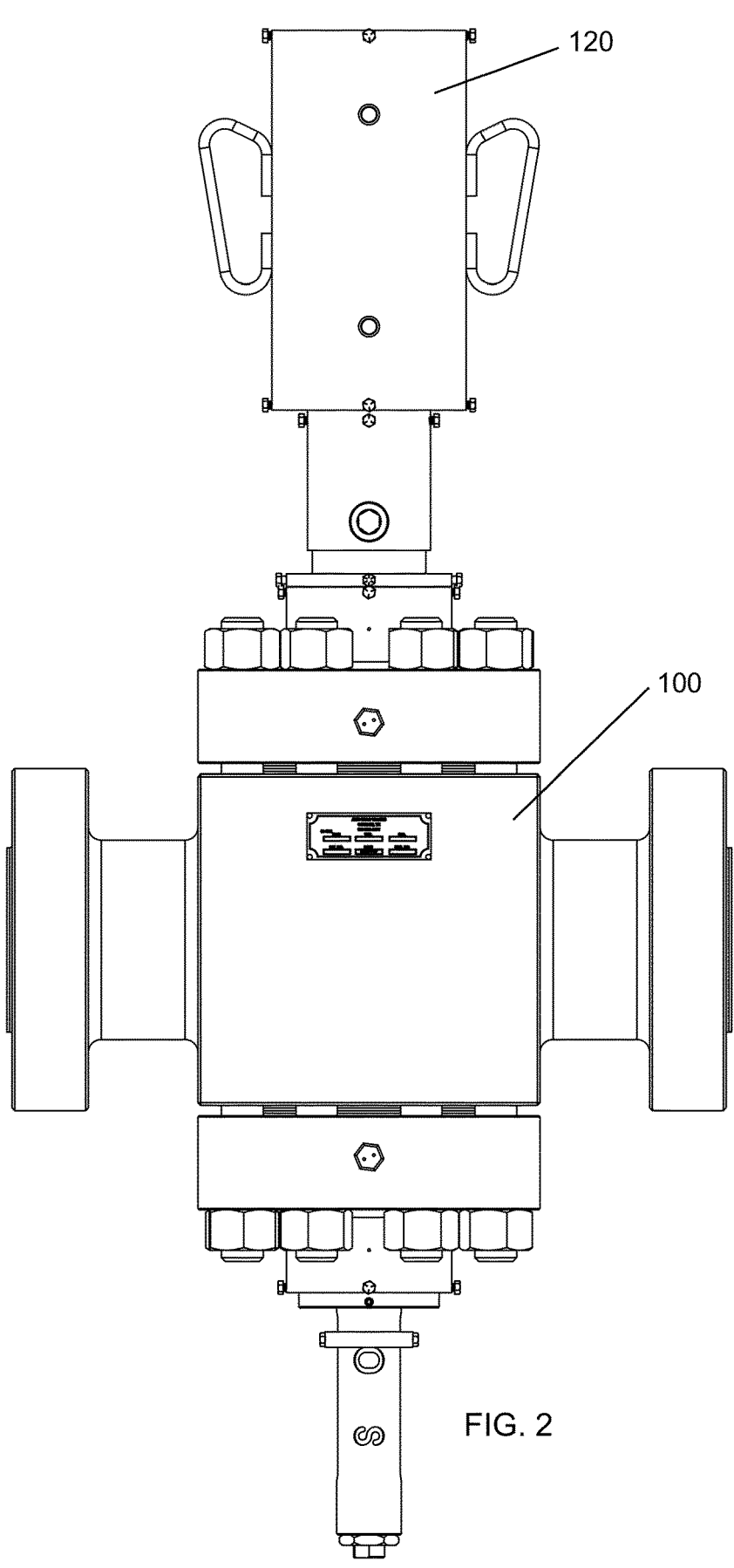
FIG. 2 depicts a plan view of a valve with a hydraulic operator, according to the present disclosure.

FIG. 1 and FIG. 2 depict plan views of a valve 100 with a manual operator 110 and a valve 100 with a hydraulic operator 120, respectively. Thus, the valve 100 may be equipped with either a manual operator 110 or a hydraulic operator 120. In some implementations, the manual operator 110 and the hydraulic operator 120 may be removable as complete assemblies and/or the manual operator 110 and the hydraulic operator 120 may be directly interchangeable. In other implementations, the valve 100 may be equipped with a pneumatic operator, an electric operator, or any other type of operator. Regardless of the type of operator employed, the valve 100 includes a valve stem and the operator includes an operator stem that may be connected via a stem connector assembly, as depicted and described herein. The stem connector assembly enables the fast removal and installation of an operator, such as the manual operator 110 or a hydraulic operator 120, while the valve 100 is completely assembled.

Figure 3:
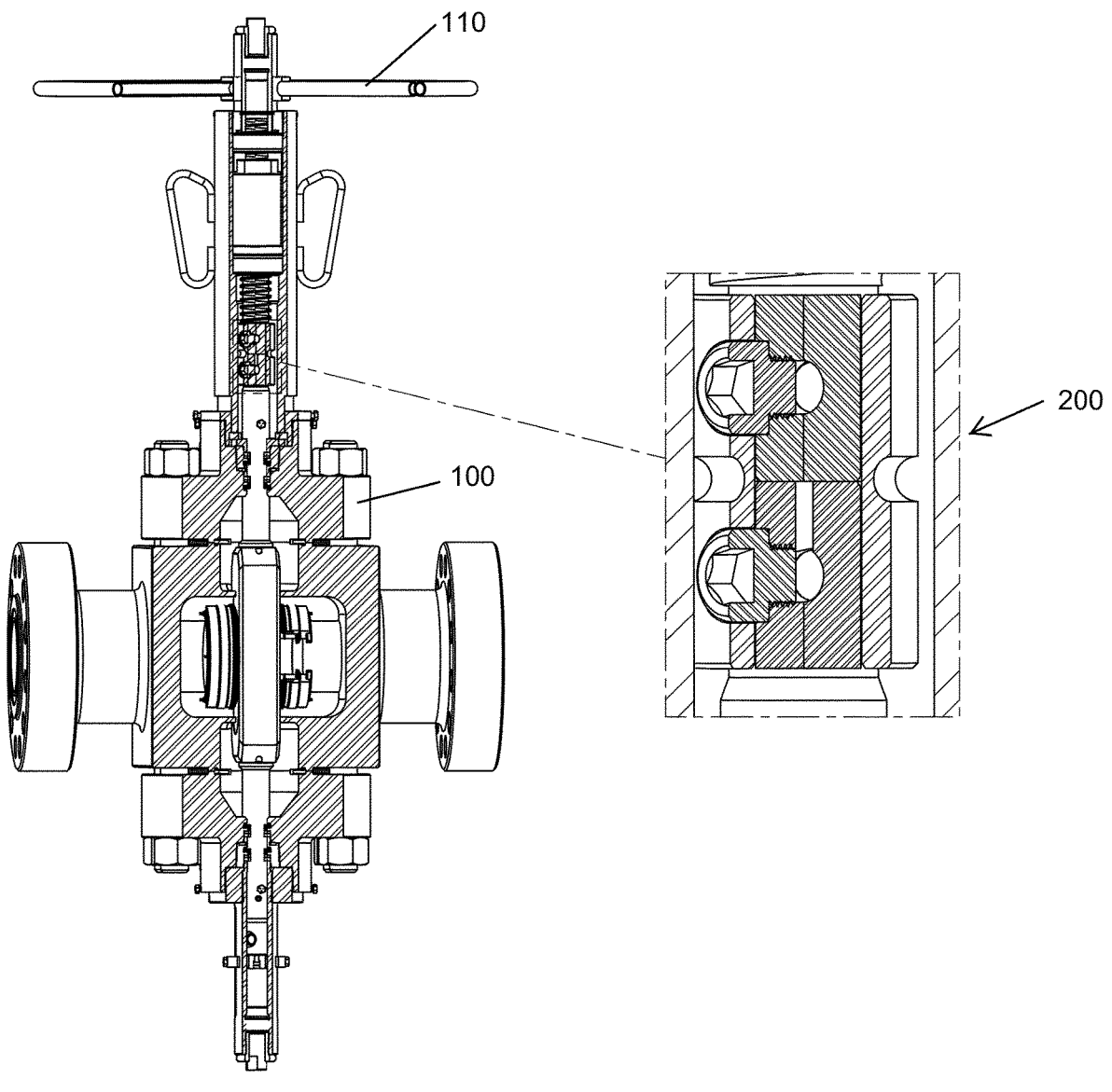
FIG. 3 depicts a side perspective, partial cross-sectional view of a gate valve with an exploded view of a stem connector assembly, according to the present disclosure.
Figure 4:
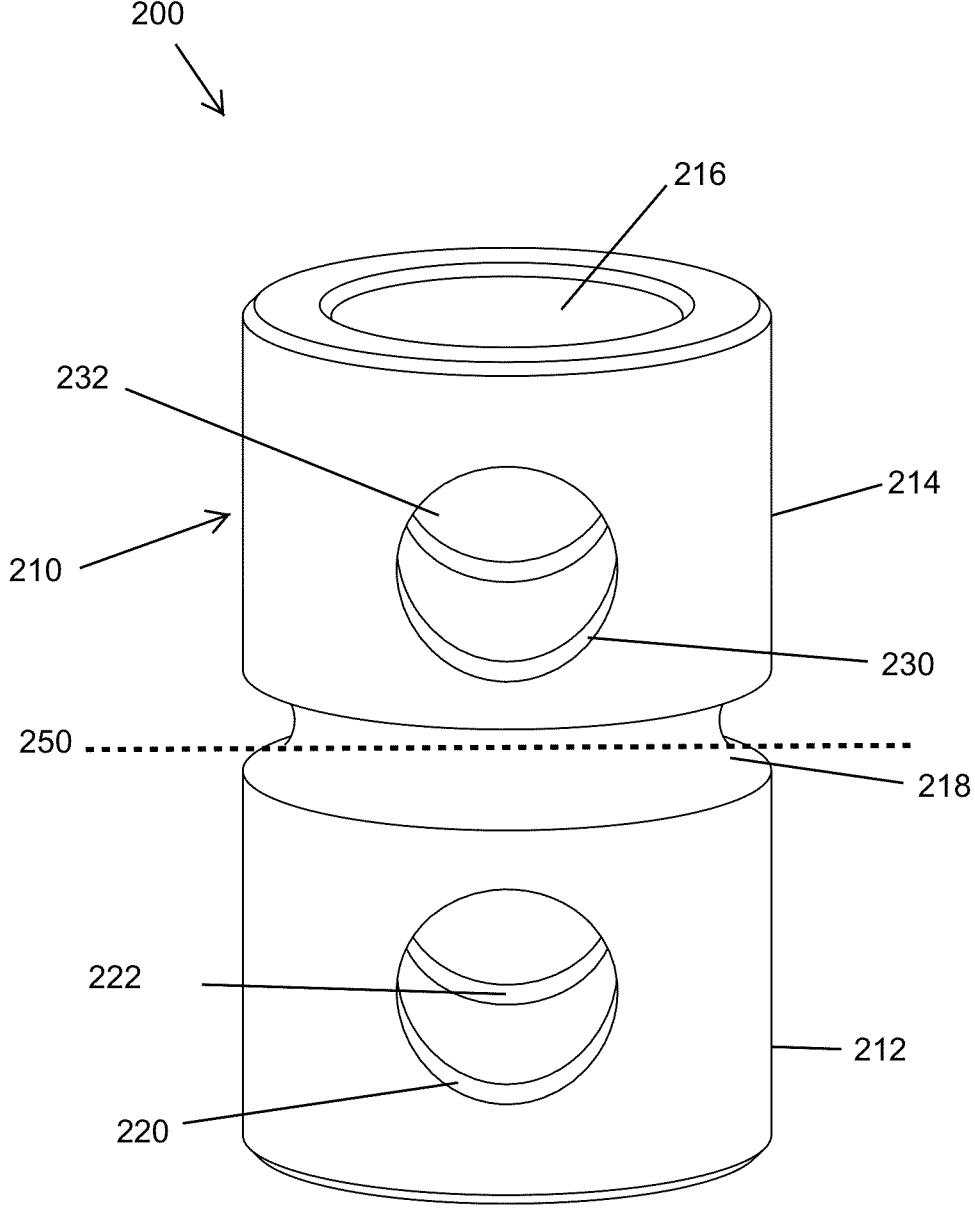
FIG. 4 depicts a perspective view of a sleeve of a stem connector assembly, according to the present disclosure.
Figure 5:
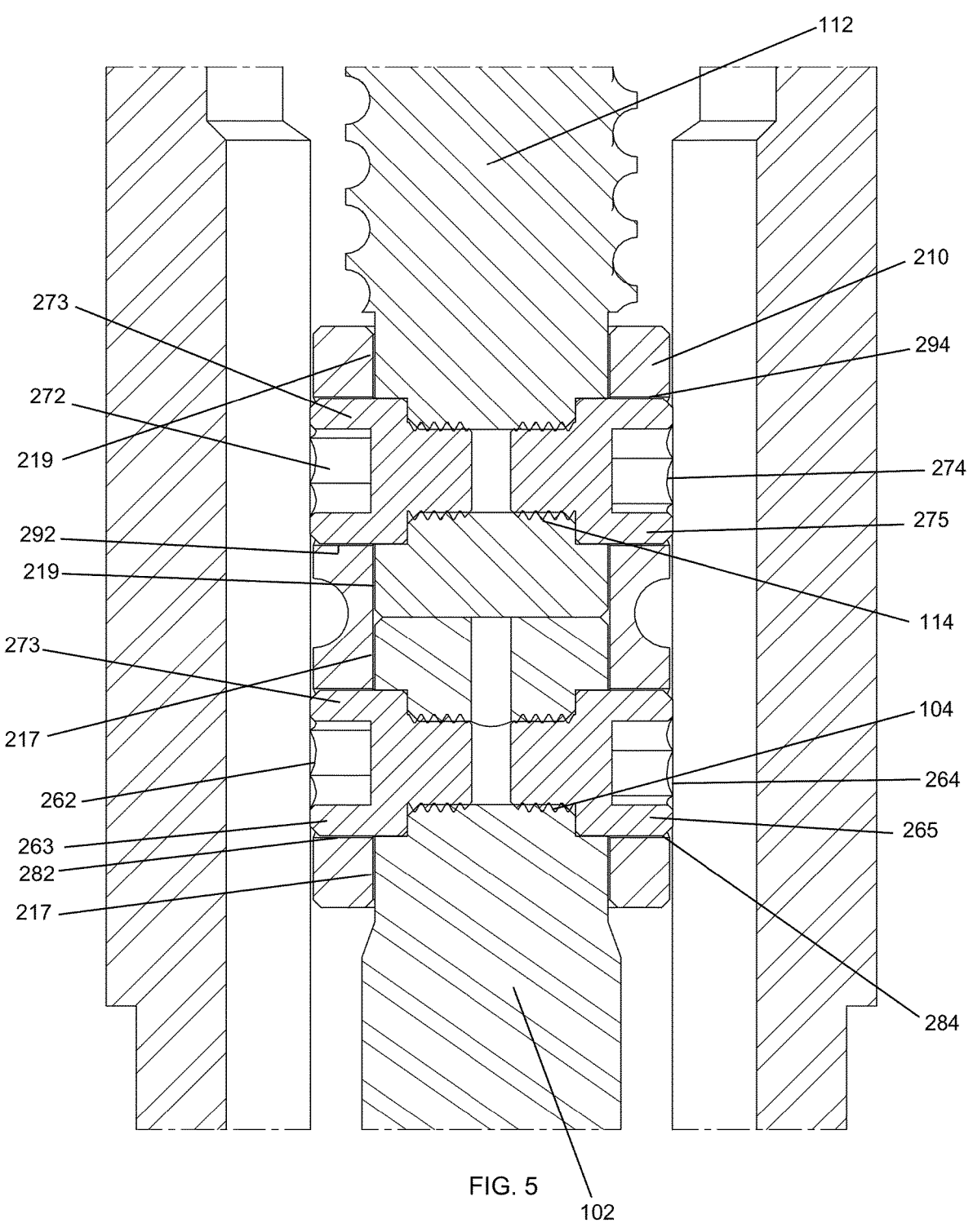
FIG. 5 depicts an exploded, cross-sectional view of a stem connector assembly coupling an operator stem and a valve stem of a gate valve, according to the present disclosure.
Figure 6:
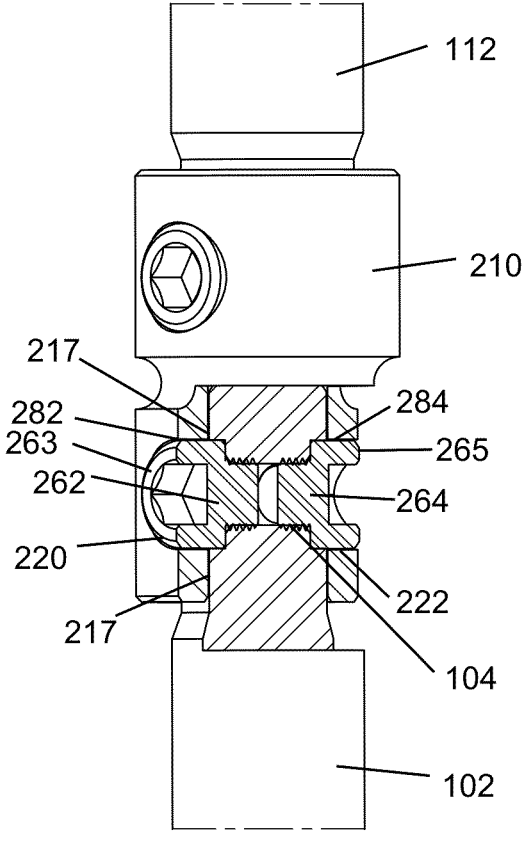
FIG. 6 depicts an exploded, partial cross-sectional view of a stem connector assembly coupling an operator stem and a valve stem, according to the present disclosure.

FIG. 3 depicts a side perspective, partial cross-sectional view of valve 100 with a manual operator 110, showing an exploded view of a stem connector assembly 200, according to the present disclosure. FIGS. 4-6 depict the stem connector assembly 200 in more detail.

Referring now to FIG. 4, the stem connector assembly 200 according to the present disclosure may comprise a stem connector sleeve 210 with a bore 216 extending longitudinally therethrough. The stem connector sleeve 210 may further comprise four holes 220, 222, 230, 232 extending radially therethrough, i.e., two sets of dual holes which may be diametrically opposed on each end 212, 214 of the stem connector sleeve 210 and symmetrically disposed about a center plane 250. The stem connector sleeve 210 may further comprise a radius-shaped, circumferential relief 218 cut along its outside diameter about midway along its length. The circumferential relief 218 may serve as a safety break to protect against high load.

With continued reference to FIG. 4, in conjunction with FIG. 5, the stem connector sleeve 210 may be used to couple a valve stem 102 with an operator stem 112. In some implementations, the stem connection methods of the present disclosure comprise connecting a pre-drilled valve stem 102 with a pre-drilled operator stem 112 without on-site match drilling and pinning a traditional axially threaded connection between the valve stem 102 and the operator stem 112. In accordance with such implementations, the valve stem 102 and the operator stem 112 may each be pre-configured with a threaded hole 104, 114 disposed therethrough to receive connectors. In some implementations, the connectors may comprise two opposing radially fitted fasteners 262, 264, 272, 274, such as socket head cap screws (or other screws of the like). Each hole 104, 114 is sized to receive the threaded socket head cap screws 262, 264, 272, 274 and to partially recess the heads 263, 265, 273, 275 of the socket head cap screws 262, 264, 272, 274 into the stems 102, 112.

The holes 220, 222, 230, 232 in the stem connector sleeve 210 are sized to receive the heads 263, 265, 273, 275 of the socket head cap screws 262, 264, 272, 274 while allowing the stem connector sleeve 210 to longitudinally move within the clearance spaces 282, 284, 292, 294 between the stem connector sleeve 210 and the socket head cap screws 262, 264, 272, 274. The bore 216 running through the length of the stem connector sleeve 210 is also sized for clearance to allow the stem connector sleeve 210 to move latitudinally within the clearance spaces 217, 219 between the stem connector sleeve 210 and the valve stem 102, and between the stem connector sleeve 210 and the operator stem 112, respectively.

FIG. 6 depicts a perspective view, partially in cross section, of the stem connector sleeve 210 coupling a valve stem 102 with an operator stem 112. The cross-sectional portion of FIG. 6 depicts details of the interaction between the stem connector sleeve 210, the valve stem 102 and the two opposing radially fitted fasteners 262, 264 extending through the stem connector sleeve 210 into the valve stem 102. Each hole 220, 222 in the stem connector 210 may be sized for clearance around the head 263, 265 of the socket head cap screw 262, 264 to allow the stem connector sleeve 210 to longitudinally move within the clearance spaces 282, 284 between the stem connector sleeve 210 and the socket head cap screws 262, 264. The bore 216 running through the length of the stem connector sleeve 210 is also sized for clearance to allow the stem connector sleeve 210 to move latitudinally within the clearance space 217 between the stem connector sleeve 210 and the valve stem 102.

In operation, when the valve stem 102 and the operator stem 112 are placed adjacent to one another, in an end-to-end arrangement, the stem connector sleeve 210 may be slid over the valve stem 102 and the operator stem 112 such that the holes 220, 222, 230, 232 of the stem connector assembly 200 are aligned with the pre-configured holes 104, 114 of the valve stem 102 and the operator stem 112, respectively. Two radially fitted fasteners 262, 264 such as socket head cap screws may be transversely inserted through the first set of holes 220, 222 of the stem connector assembly 200 and the pre-configured hole 104 of the valve stem 102 to secure the stem connector sleeve 210 to the valve stem 102. Likewise, two radially fitted fasteners 272, 274 such as socket head cap screws may be inserted through the second set of holes 230, 232 of the stem connector assembly 200 and the pre-configured hole 114 of the operator stem 112 to secure the stem connector sleeve 210 to the operator stem 112. This allows for the transfer of torsional, translational, or torsional and translational, loading and forces to the socket head cap screws 262, 264, 272, 274 while the clearance spaces 282, 284, 292, 294, 217, 219 allow the stem connector assembly 200 to self adjust.

This configuration allows the valve stem 102 and operator stem 112 to independently align while torsional and translational loading is transferred through the radially fitted fasteners 262, 264, 272, 274. These fasteners 262, 264, 272, 274 have been fitted such that the stem connector sleeve 210 can self adjust the alignment between the stems 102, 112 while the loading is transferred through the bolt heads 263, 265, 273, 275 of the socket head cap screws 262, 264, 272, 274 that are partially recessed into the stems 102, 112. This creates a circular shear plane at the outer circumference of the stems 102, 112 through the cylindrical bolt heads 263, 265, 273, 275 without transferring load through the threaded portion of the fastener(s) 262, 264, 272, 274.

FIGS. 3-6 depict only one implementation of a stem connector assembly 200 operable to perform the stem connector method of the present disclosure, while many variations are contemplated. While FIGS. 3-6 depict a single, solid sleeve 210 that slides over stems 102, 112, variations such as a multi-part sliding sleeve or a multi-part clamping sleeve may be used instead. While FIGS. 3-6 depict fasteners with bolt heads 263, 265, 273, 275 that act as shear components, any device or feature that extends between the sleeve 210 and recesses at least partially into the stems 102, 112 is operable as a shear component. While FIGS. 3-6 depict pre-configured threaded holes 104, 114 extending through the stems 102, 112, variations such as pre-configured recesses may be employed instead of holes 104, 114. In such implementations, shear components of any form may be positioned through the holes 220, 222, 230, 232 in the sleeve 210 to extend into the pre-configured recesses in the stems 102, 112 and held in place by a wrap around the sleeve 210. In another implementation, instead of a solid sleeve 210 with holes 220, 222, 230, 232, a split sleeve may be used that includes shear components formed into an interior wall thereof. In such an implementation, the shear components would extend into the recesses in stems 102, 112 when the split sleeve is positioned over the stems 102, 112. Many other variations are possible.

Figure 7:
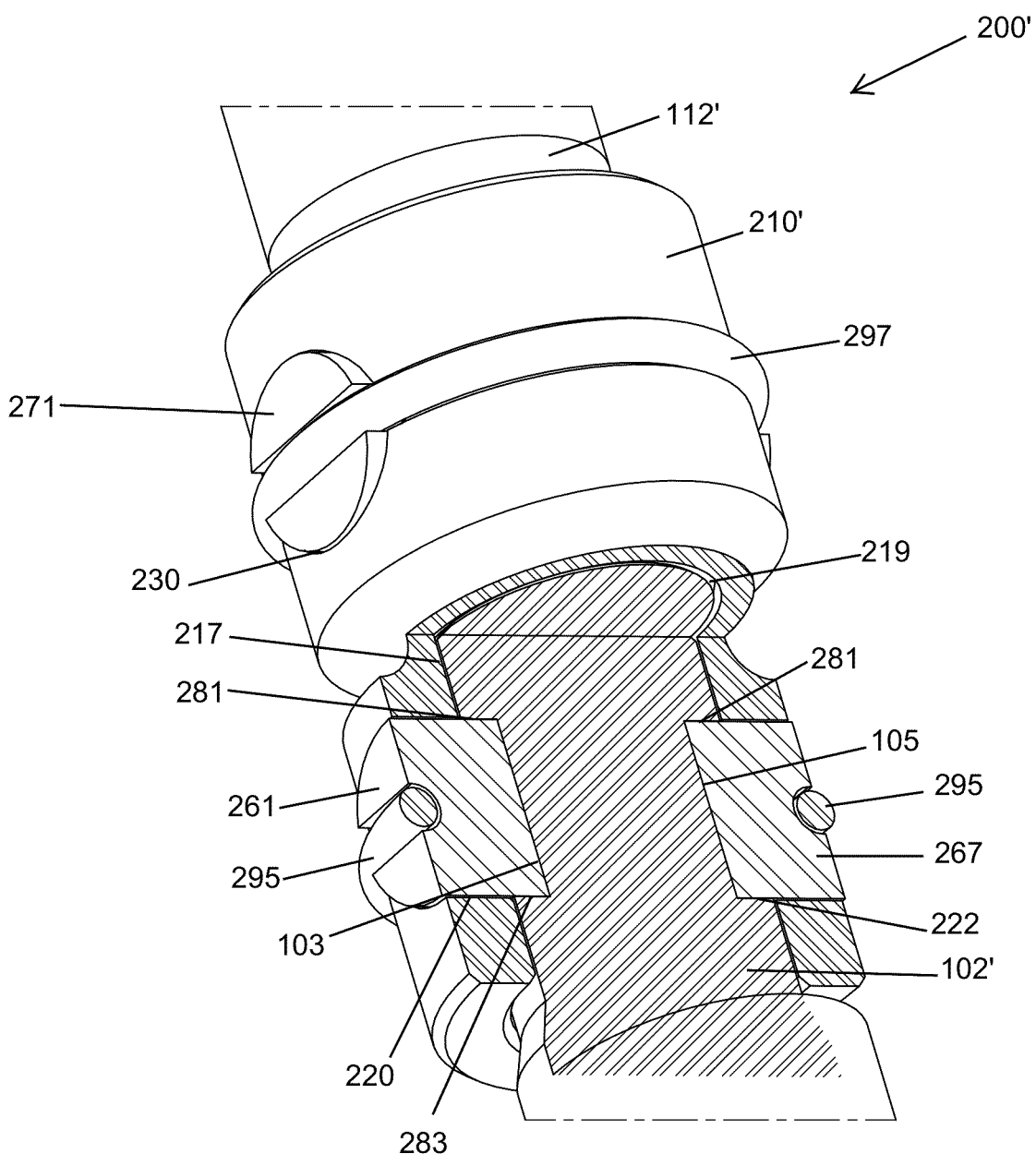
FIG. 7 depicts a perspective, partial cross-sectional view of another implementation of a stem connector assembly coupling an operator stem and a valve stem, according to the present disclosure.
Figure 8:
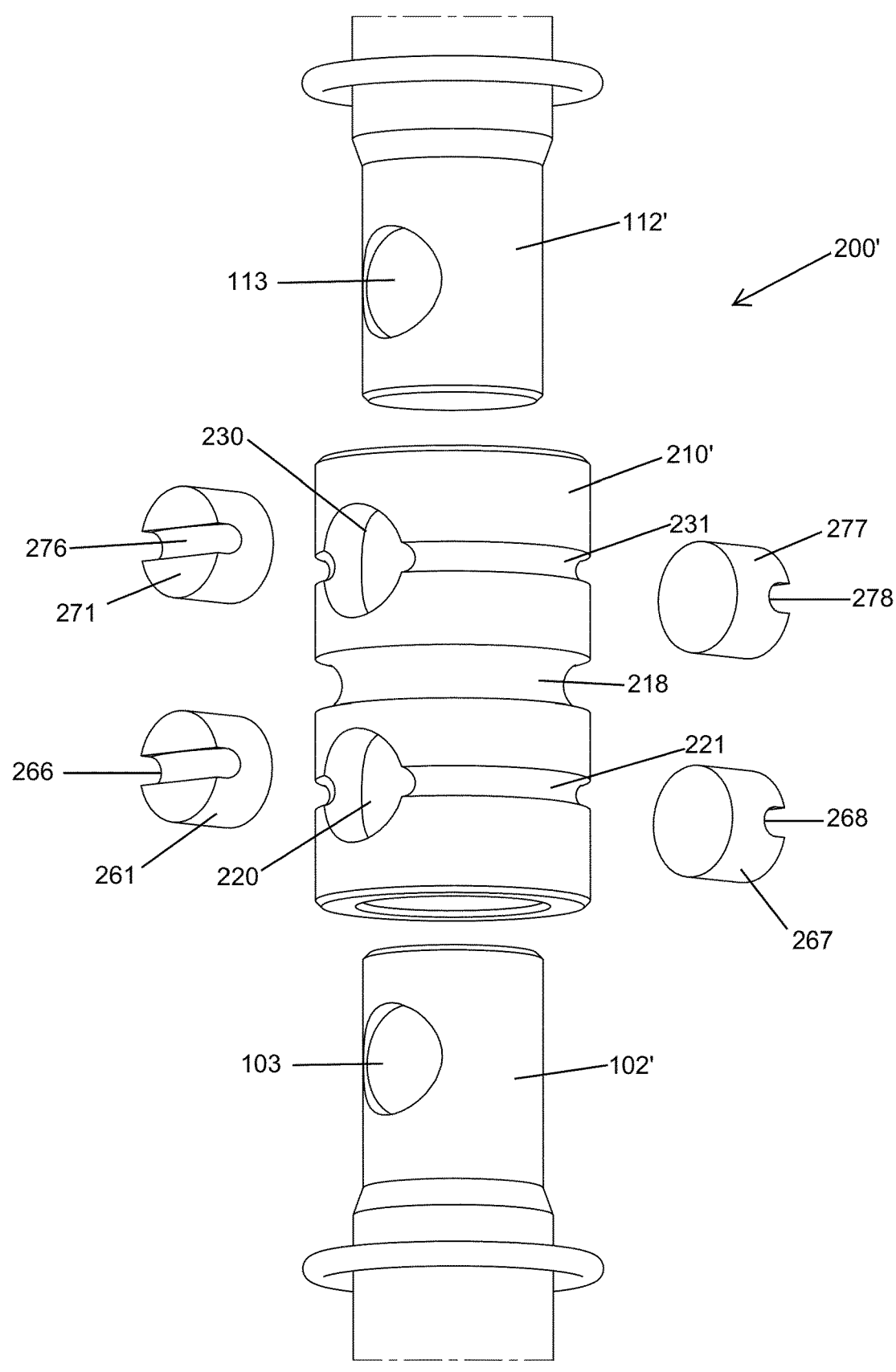
FIG. 8 depicts an exploded perspective view of the separate components forming the stem connector assembly of FIG. 7 along with the operator stem and the valve stem.

In more detail, FIG. 7 depicts a perspective, partial cross-sectional view and FIG. 8 depicts an exploded perspective view of the separate components forming one such variation. In this implementation, the valve stem 102' includes pre-configured recesses 103, 105 instead of a pre-configured threaded hole 104, and the operator stem 112' likewise includes pre-configured recesses 113, 115 instead of a pre-configured threaded hole 114. The sleeve 210' of the stem connector assembly 200' includes through holes 220, 222, 230, 232, a first circumferential indentation 221 that crosses over through holes 220, 222, and a second circumferential indentation 231 that crosses over though holes 230, 232.

In this implementation of the stem connector assembly 200', the first set of fasteners comprises pins 261, 267, each extending through a respective hole 220, 222 of the sleeve 210' and into recesses 103, 105 in the valve stem 102' to secure the sleeve 210' to the valve stem 102'. The second set of fasteners comprises pins 271, 277, each extending through a respective hole 230, 232 of the sleeve 210' and into recesses 113, 115 in the operator stem 112' to secure the sleeve 210' to the operator stem 112'. Pins 261, 267 may be held in position by a circumferential wrap 295 that surrounds the sleeve 210' and fits within grooves 266, 268 in the pins 261, 267 and within indentation 221 in the sleeve 210'. Likewise, pins 271, 277 may be held in position by a circumferential wrap 297 that surrounds the sleeve 210' and fits within grooves 276, 278 in the pins 271, 277 and within indentation 231 in the sleeve 210'. In some implementations, the circumferential wraps 295, 297 may be o-rings.

The holes 220, 222, 230, 232 in the stem connector sleeve 210' are sized to receive the pins 261, 267, 271, 277 while allowing the stem connector sleeve 210' to longitudinally move within the clearance spaces 281, 283, 291, 293 between the stem connector sleeve 210' and the pins 261, 267, 271, 277. The bore 216 running through the length of the stem connector sleeve 210' is also sized for clearance to allow the stem connector sleeve 210' to move latitudinally within the clearance spaces 217, 219 between the stem connector sleeve 210' and the valve stem 102', and between the stem connector sleeve 210' and the operator stem 112', respectively.

In operation, when the valve stem 102' and the operator stem 112' are placed adjacent to one another, in an end-to-end arrangement, the stem connector sleeve 210' may be slid over the valve stem 102' and the operator stem 112' such that the holes 220, 222, 230, 232 of the stem connector assembly 200' are each aligned with the respective pre-configured recesses 103, 105, 113, 115 of the valve stem 102' and the operator stem 112', respectively. Two radially fitted fasteners 261, 267 such as pins may be transversely inserted through the first set of holes 220, 222 of the stem connector assembly 200' and into the pre-configured recesses 103, 105 of the valve stem 102'. Likewise, two radially fitted fasteners 271, 277 such as pins may be inserted through the second set of holes 230, 232 of the stem connector assembly 200' and into the pre-configured recesses 113, 115 of the operator stem 112'. This allows for the transfer of torsional, translational, or torsional and translational, loading and forces to the pins 261, 267, 271, 277 while the clearance spaces 281, 283, 291, 293, 217, 219 allow the stem connector assembly 200' to self adjust.

This configuration allows the valve stem 102' and the operator stem 112' to independently align while torsional and translational loading is transferred through the radially fitted pins 261, 267, 271, 277. These pins 261, 267, 271, 277 have been fitted such that the stem connector sleeve 210' can self adjust the alignment between the stems 102', 112' while the loading is transferred through the pins 261, 267, 271, 277 that extend into recesses 103, 105, 113, 115 in the stems 102', 112'. This creates a circular shear plane at the outer circumference of the stems 102', 112' through the pins 261, 267, 271, 277.

Figure 9:
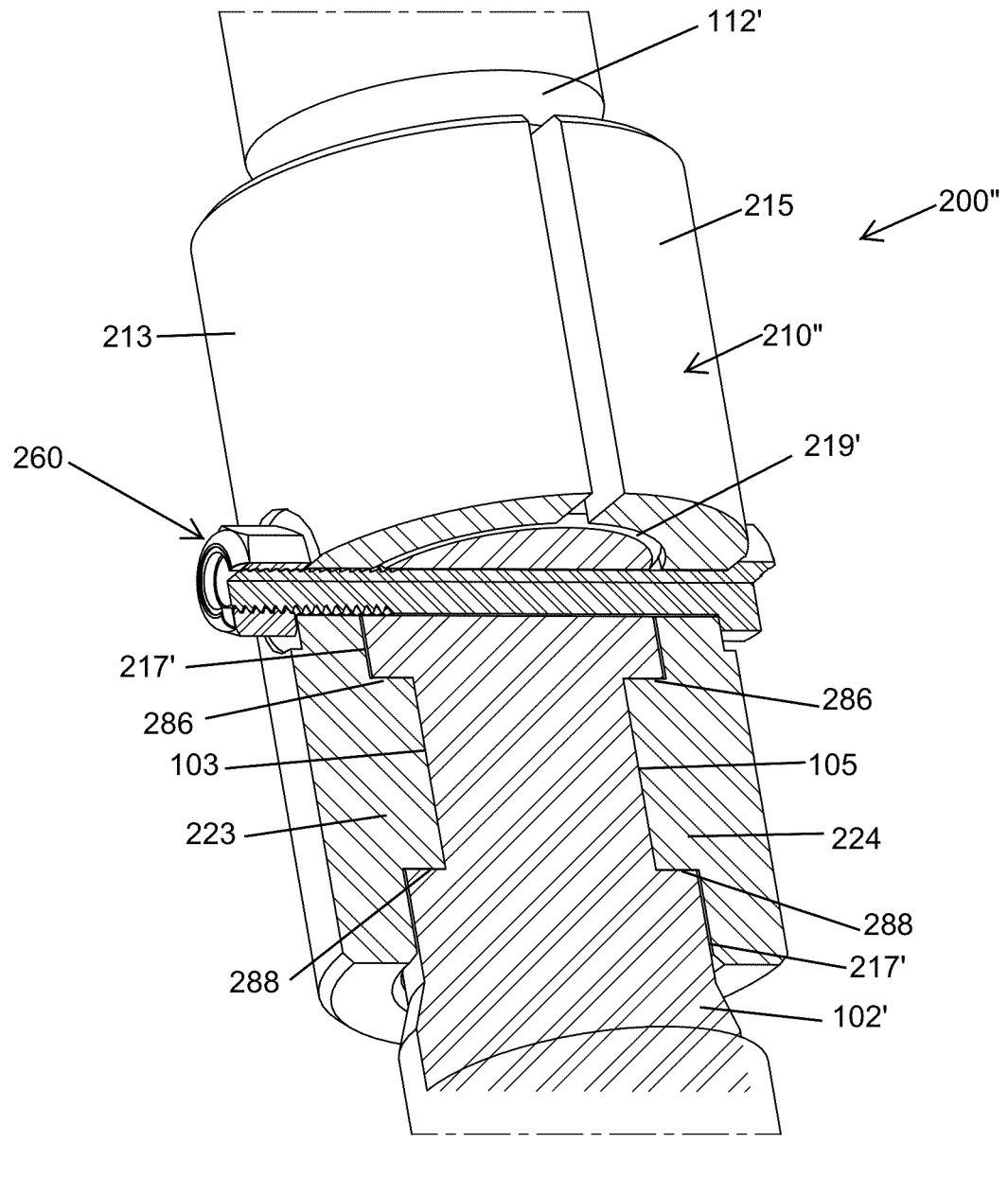
FIG. 9 depicts a perspective, partial cross-sectional view of yet another implementation of a stem connector assembly coupling an operator stem and a valve stem, according to the present disclosure.
Figure 10:
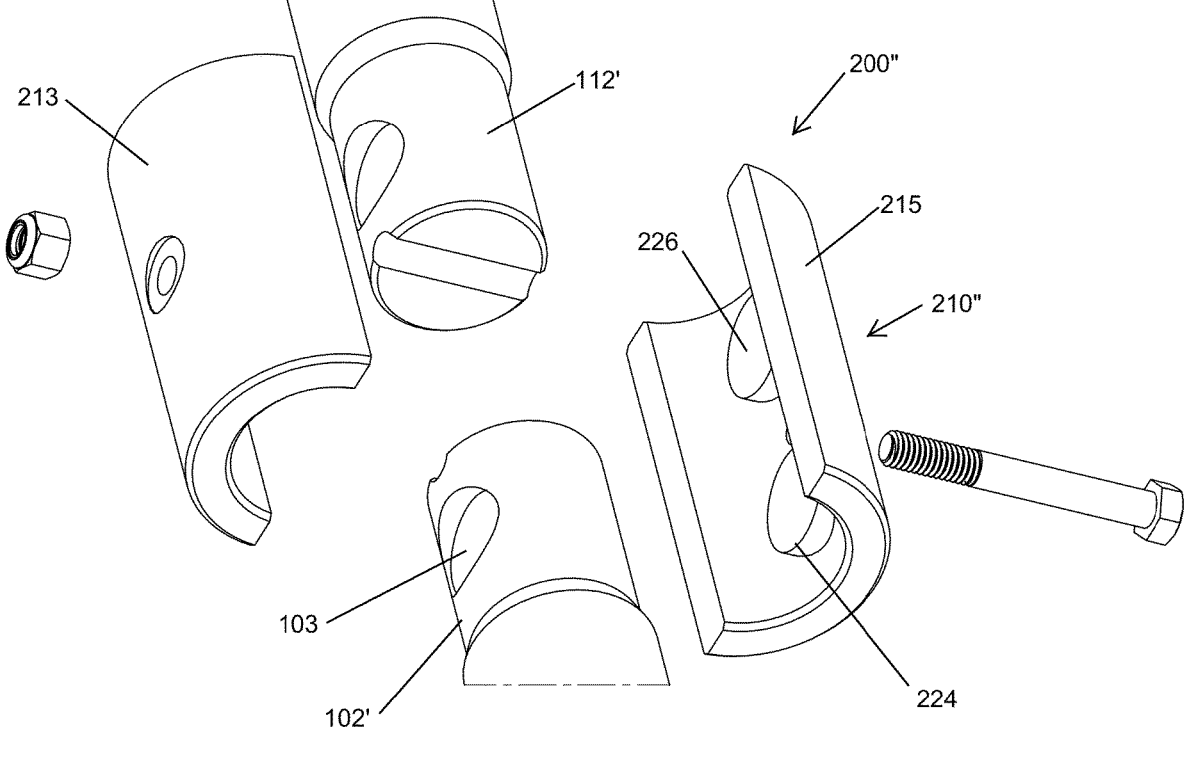
FIG. 10 depicts an exploded perspective view of the separate components forming the stem connector assembly of FIG. 9 along with the operator stem and the valve stem.

FIG. 9 depicts a perspective, partial cross-sectional view and FIG. 10 depicts an exploded perspective view of the separate components forming another variation. This implementation includes the valve stem 102' with pre-configured recesses 103, 105 and the operator stem 112' with pre-configured recesses 113, 115. However, in this implementation of the stem connector assembly 200", the sleeve 210" is formed of a first half 213 and a second half 215 that are coupled together, such as via a bolting assembly 260. The first half 213 includes interior bosses 223, 225 and the second half 215 also includes interior bosses 224, 226.

In this implementation of the stem connector assembly 200", the shear components comprise the interior bosses 223, 225, 224, 226, each extending from the first half 213 or from the second half 215 of the sleeve 210" and into respective recesses 103, 105, 113, 115 in the valve stem 102' and the operator stem 112' when the bolting assembly 260 secures the sleeve 210" to the stems 102', 112'.

The recesses 103, 105, 113, 115 in the stems 102', 112' are sized to receive the interior bosses 223, 225, 224, 226 of the sleeve 210" while allowing the stem connector sleeve 210" to longitudinally move within the clearance spaces 286, 288, 296, 298 between the stem connector sleeve 210" and the interior bosses 223, 225, 224, 226. The bolting assembly 260 may be tightened to provide clearance to allow the stem connector sleeve 210" to move latitudinally within the clearance spaces 217', 219' between the stem connector sleeve 210" and the valve stem 102', and between the stem connector sleeve 210' and the operator stem 112', respectively.

In operation, when the valve stem 102' and the operator stem 112' are placed adjacent to one another, in an end-to-end arrangement, the stem connector sleeve 210" may be positioned over the valve stem 102' and the operator stem 112' and coupled together via bolting assembly 260 such that the interior bosses 223, 225, 224, 226 of the stem connector assembly 200" extend into the respective pre-configured recesses 103, 105, 113, 115 of the valve stem 102' and the operator stem 112', respectively. This allows for the transfer of torsional, translational, or torsional and translational, loading and forces to the interior bosses 223, 225, 224, 226 while the clearance spaces 286, 288, 296, 298, 217', 219' allow the stem connector assembly 200" to self adjust.

This configuration allows the valve stem 102' and the operator stem 112' to independently align while torsional and translational loading is transferred through the radially fitted interior bosses 223, 225, 224, 226. These interior bosses 223, 225, 224, 226 have been fitted such that the stem connector sleeve 210" can self adjust the alignment between the stems 102', 112' while the loading is transferred through the interior bosses 223, 225, 224, 226 that extend into recesses 103, 105, 113, 115 in the stems 102', 112'. This creates a circular shear plane at the outer circumference of the stems 102', 112' through the interior bosses 223, 225, 224, 226.

Figure 11:
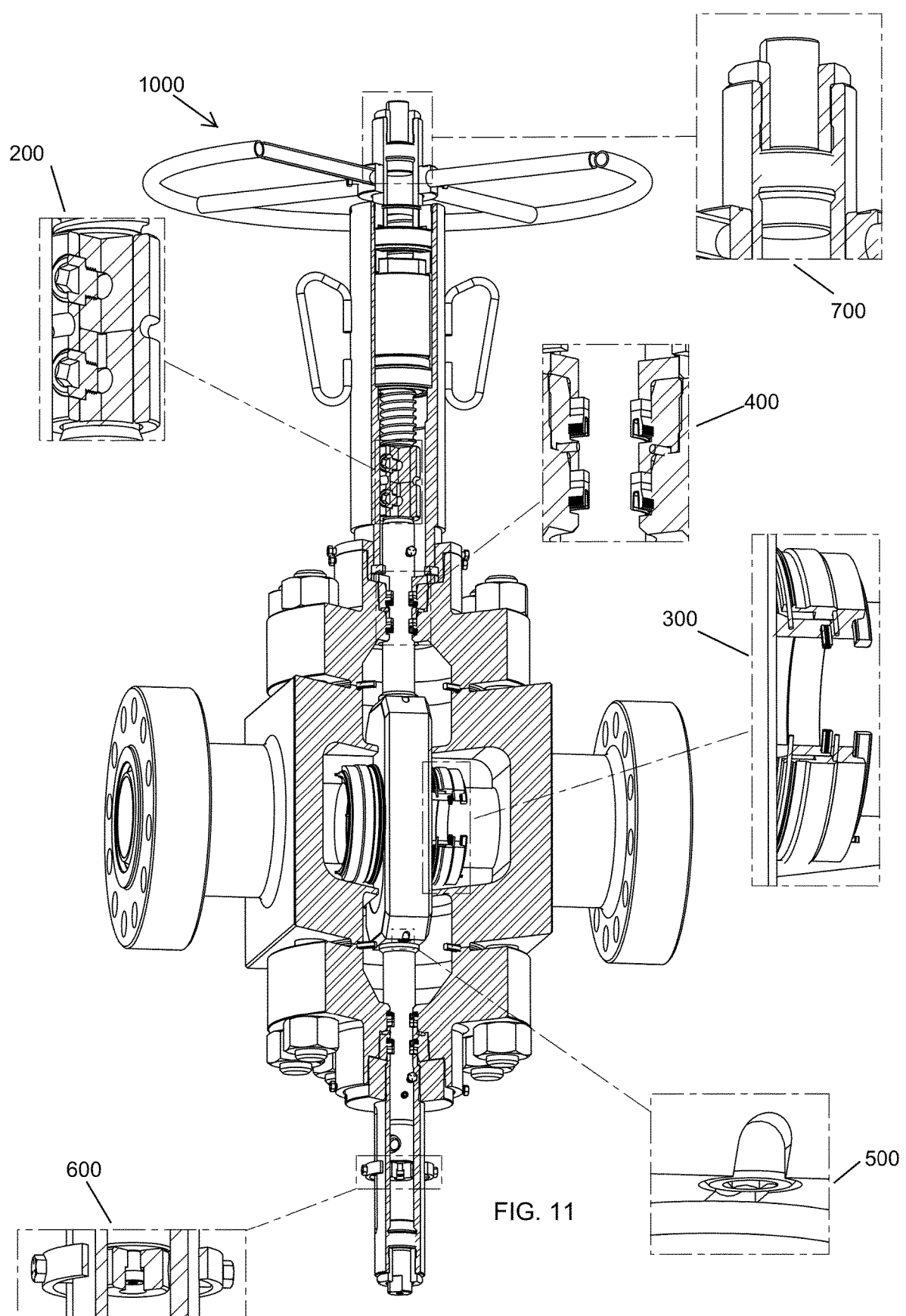
FIG. 11 depicts a side perspective, partial cross-sectional view of a gate valve with exploded views of the following assemblies: a stem connector assembly, a replaceable seat pocket assembly, a redundant packing assembly, a gate/stem connection assembly, a high visibility position indicator assembly, and an external drift adjustment assembly, according to the present disclosure.

Referring now to FIG. 11, a valve that employs a stem connector assembly as disclosed and depicted herein may further comprise one or more additional assemblies. FIG. 11 depicts a side perspective, partial cross-sectional view of a gate valve 1000 with exploded views of the following assemblies: a stem connector assembly 200, a replaceable seat pocket assembly 300, a redundant packing assembly 400, a gate/stem connection assembly 500, a high visibility position indicator assembly 600, and an external drift adjustment assembly 700.

Figure 12:
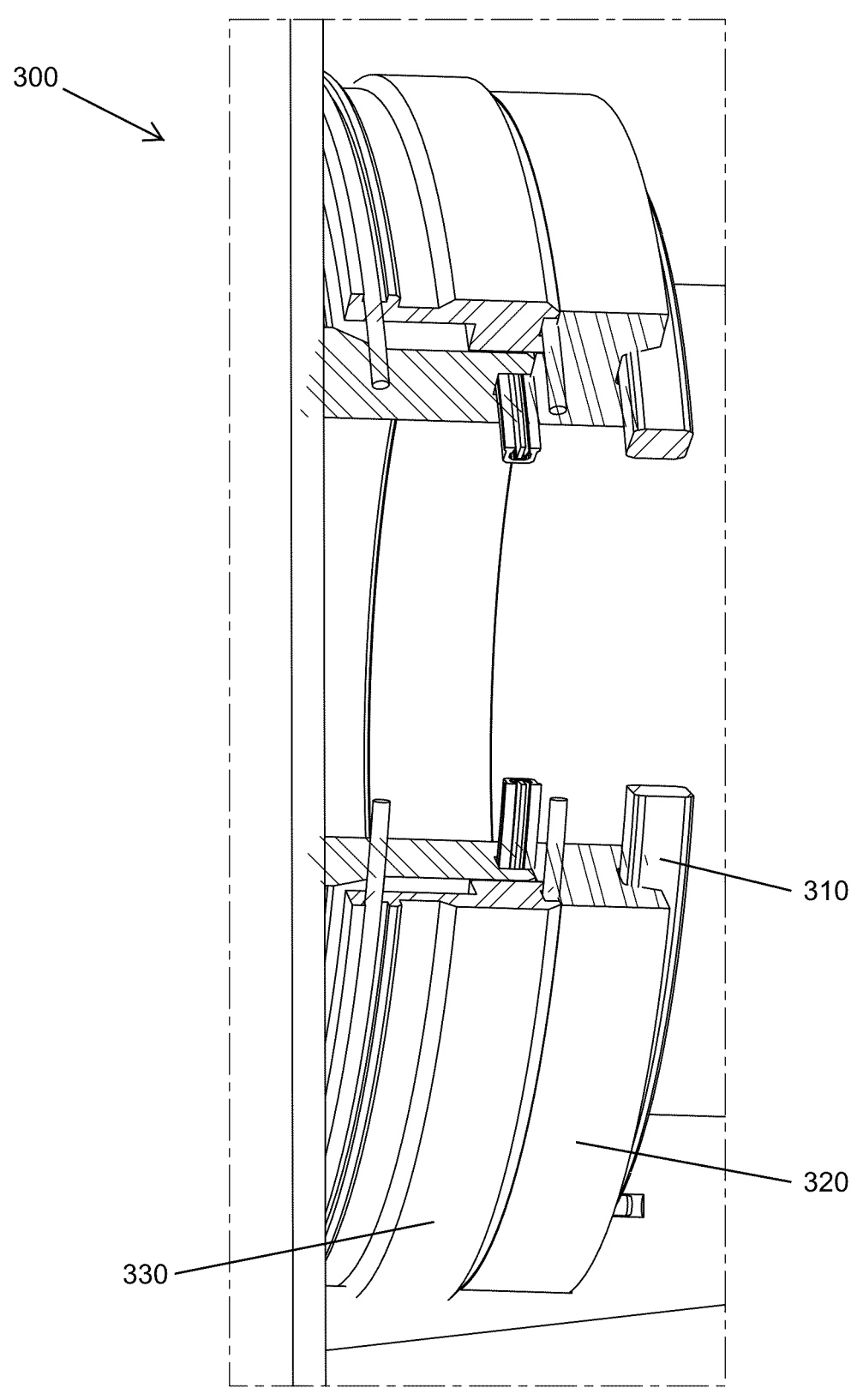
FIG. 12 depicts an exploded, partial cross-sectional view of a replaceable seat pocket assembly, according to the present disclosure.

FIG. 12 depicts an exploded view of a replaceable seat pocket assembly 300. The replaceable seat pocket assembly 300 may include three main portions 310, 320, 330 that engage the valve body. Thus, the replaceable seat pocket assembly 300 acts as a wear buffer between the valve seat and the valve body. In an implementation, the replaceable seat pocket assembly 300 provides an all metal sealing system that can be replaced in minutes, thereby providing a new surface for the valve seat to seal against without requiring welding or machining. In an implementation, the replaceable seat pocket assembly 300 is depicted and described in U.S. Pat. No. 10,316,976 B2, the disclosure of which is incorporated herein by reference in its entirety.

Figure 13:
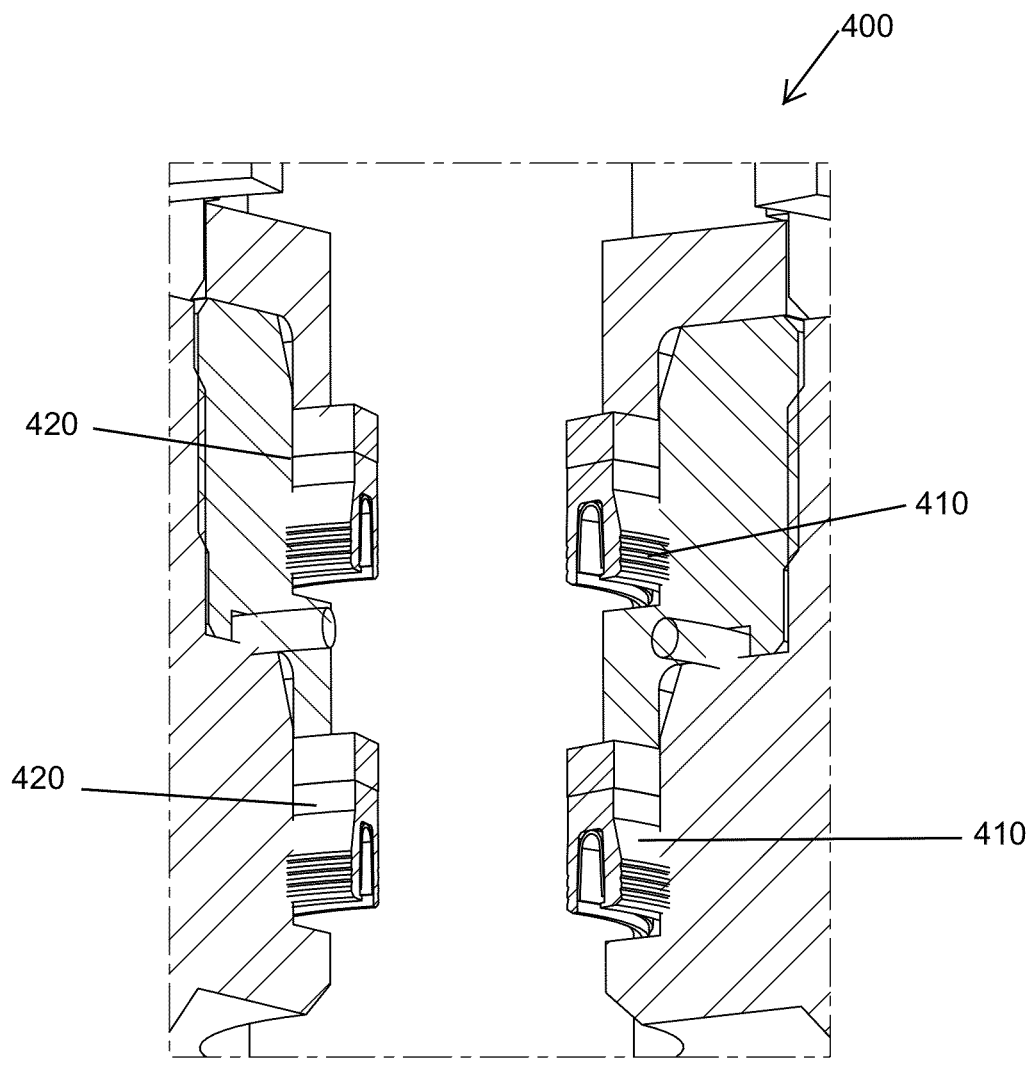
FIG. 13 depicts an exploded, partial cross-sectional view of a redundant packing assembly, according to the present disclosure.

FIG. 13 depicts an exploded view of a redundant packing assembly 400. In an implementation, the redundant packing assembly 400 uses two identical PR2 qualified packings 410 in separate glands 420 for redundant sealing capabilities.

Figure 14:
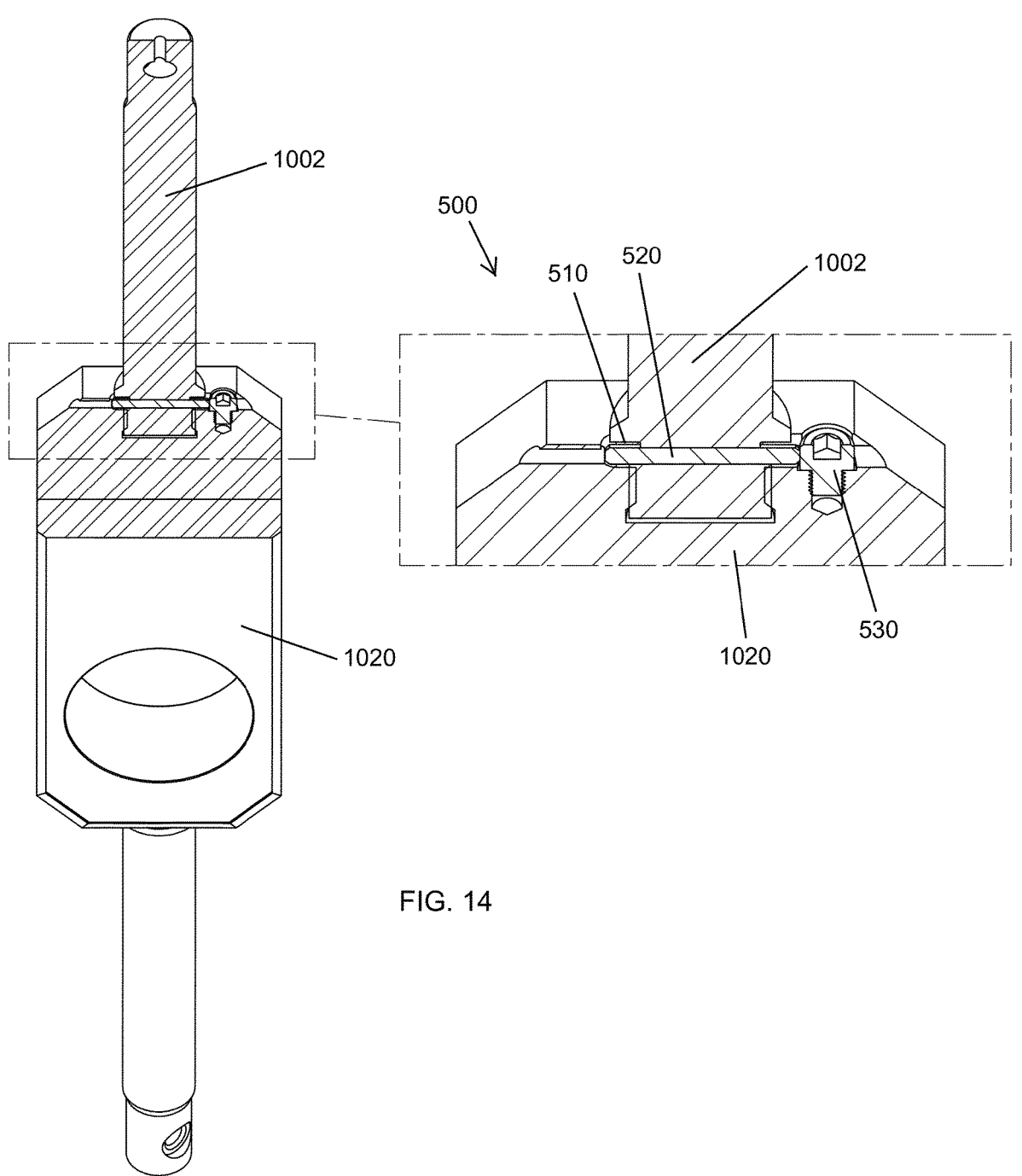
FIG. 14 depicts a perspective, partial cross-sectional view of gate and stem portions of a gate valve coupled together, as well as an exploded cross-sectional view of a gate/stem connection assembly, according to the present disclosure.

FIG. 14 depicts a side perspective view of gate 1020 and stem 1002 portions of the gate valve 1000 coupled together, as well as an exploded view of a gate/stem connection assembly 500. In an implementation, the gate/stem connection assembly 500 comprises a thread 510, pin 520, and bolt

530 connection, which is operable to join two independently aligned components, i.e. the gate 1020 and the valve stem 1002, such that their individual alignments are separately maintained and bridged by the connection. This connection provides for the transfer of torsional, translational, or torsional and translational, loading and forces.

Referring again to FIG. 14, a thread 510, pin 520, and bolt 530 connection is depicted for coupling the gate 1020 and the valve stem 1002. In this configuration, the gate 1020 and the stem 1002 are allowed to independently align while torsional and translation loading is transferred through the gate/stem connection 500. This loading transfer is accomplished by providing threads 510 that allow limited axial and radial movement that is constrained rotationally by the pin 520 that is captured by the bolt 530 such that it is also allowed limited movement. The result is a strong connection that provides limited movement in all directions. Thus, the thread 510, pin 520, and bolt 530 connection provides a robust, secure, and compact connection that does not require drilling or machining.

Figure 15:
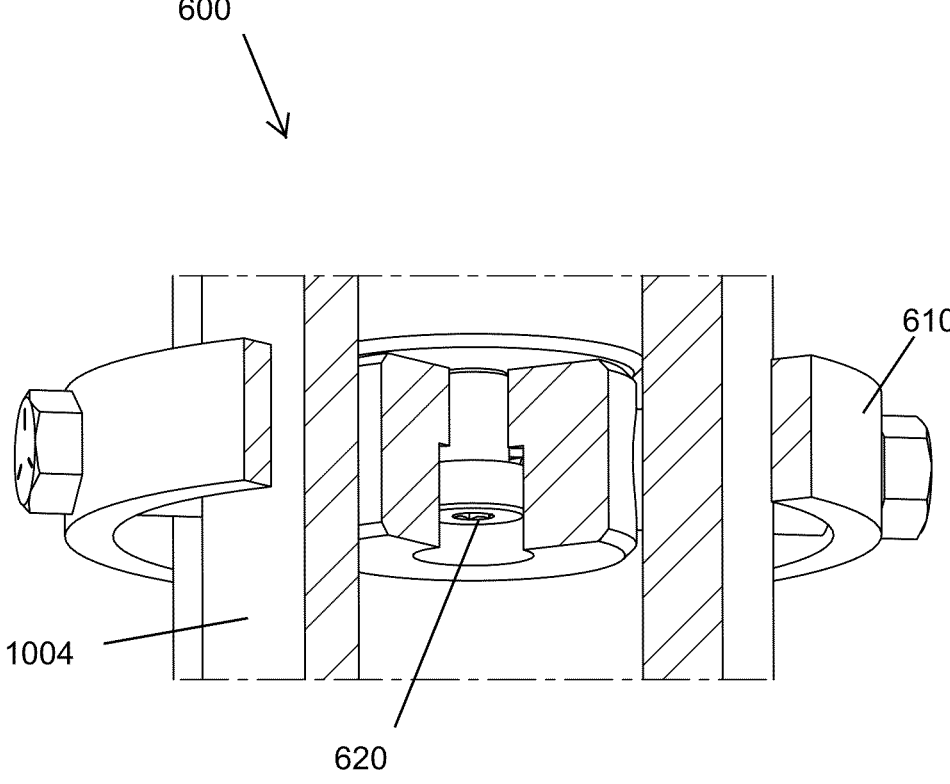
FIG. 15 depicts an exploded, partial cross-sectional view of a high visibility position indicator assembly, according to the present disclosure.

FIG. 15 depicts an exploded view of the high visibility position indicator assembly 600. The high visibility position indicator assembly 600 includes a highly visible ring 610 that travels with, and is attached to, the lower (balance) stem 1004 of the valve 1000. The ring 610 is positioned outside of the outer most surface of the balance stem 1004 and rigidly connected to a central hub 620 that is affixed to the balance stem 1004 such that it is allowed enough movement to prevent jamming.

Figure 16:
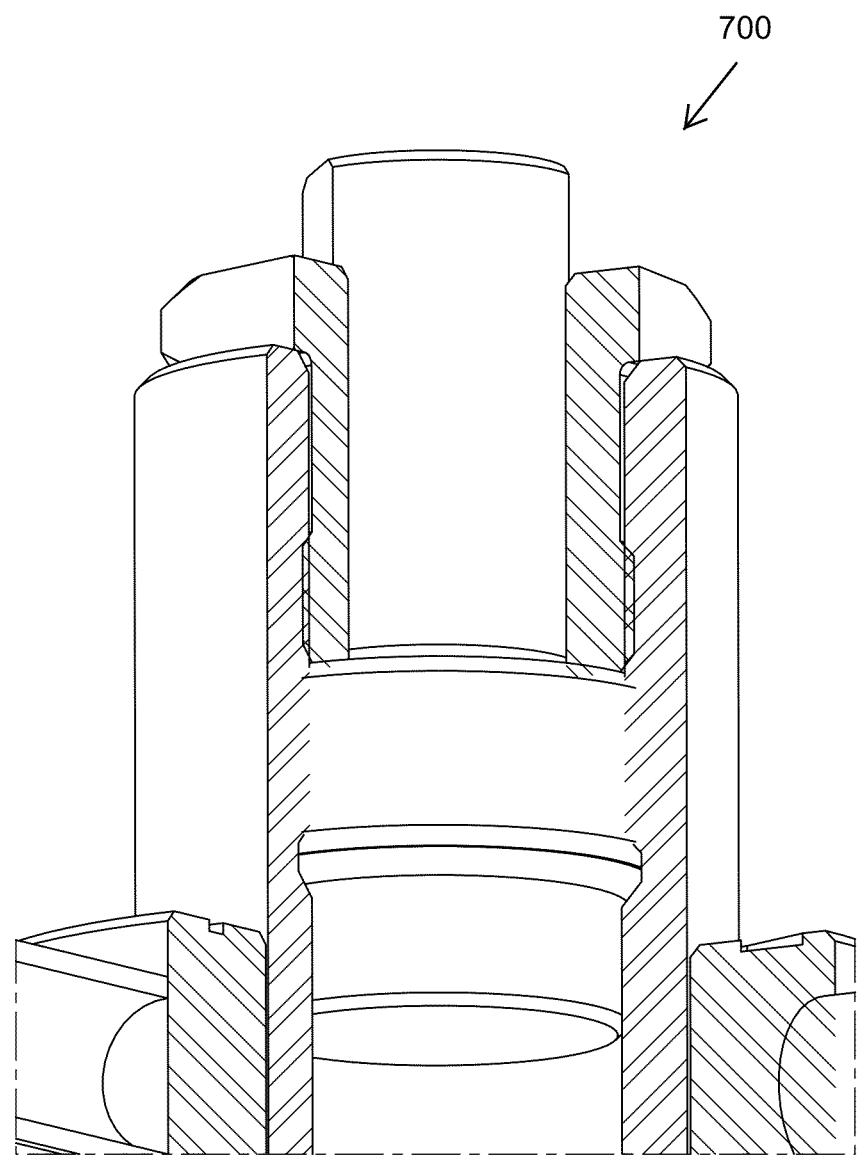
FIG. 16 depicts an exploded, partial cross-sectional view of an external drift adjustment assembly, according to the present disclosure.
Figure 17:
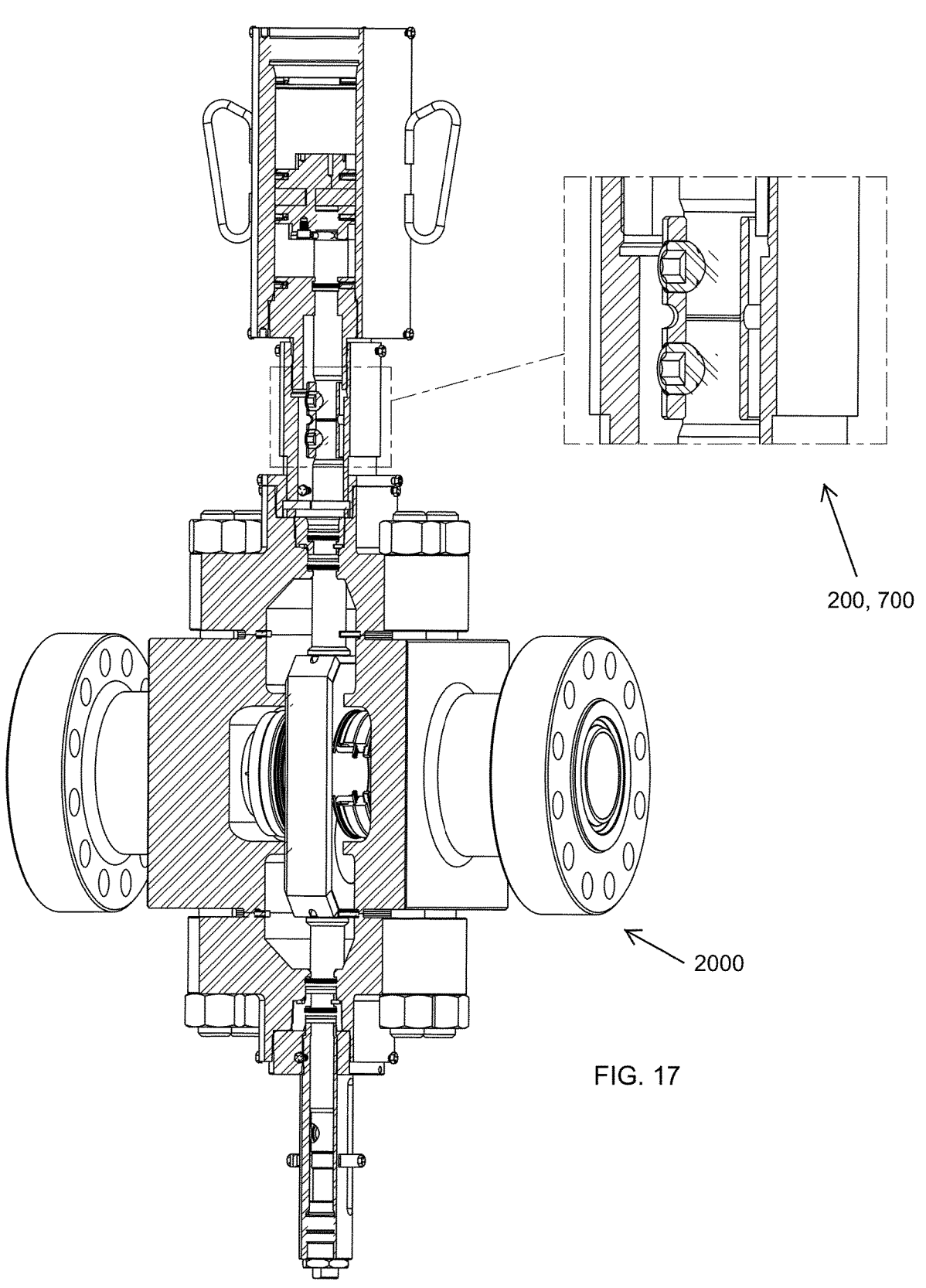
FIG. 17 depicts a side perspective, partial cross-sectional view of a hydraulically operated gate valve with an exploded view of a stem connector and a drift adjustment assembly, according to the present disclosure.

Referring now to FIG. 16 and FIG. 17, external drift (stroke) adjustment is a process by which the travel limits of a valve are set after full valve assembly. The valve must initially be designed to accept the adjustable limits by not being restricted internally within the limits of the adjustment. In an implementation, the valves 100, 1000 of the present disclosure are designed to accept stroke adjustment in both the open and closed positions. This is accomplished with drift and stroke stops which contact and directly stop axial stem movement. Adjustments are made by threaded positioning and locked by a jam nut on the same thread.

FIG. 16 depicts an exploded view of an external drift adjustment assembly 700 for a manually operated gate valve. In an implementation, the manual valve drift may be adjusted after valve assembly. The external drive adjustment may be set to the traditional ¼ turn back or to stop at drift. In an implementation, the count turns to set the stroke stop, consistently resulting in the proper turn count.

FIG. 17 depicts a side perspective, cross-sectional view of a hydraulically operated gate valve 2000 with an exploded view of a stem connector 200 and a drift adjustment assembly 700. In an implementation, the hydraulic valve drift may be adjusted after valve assembly. In an implementation, the stroke is preset, so the drift is adjusted by turning the hydraulic cylinder and the stroke is set.

Figure 18:
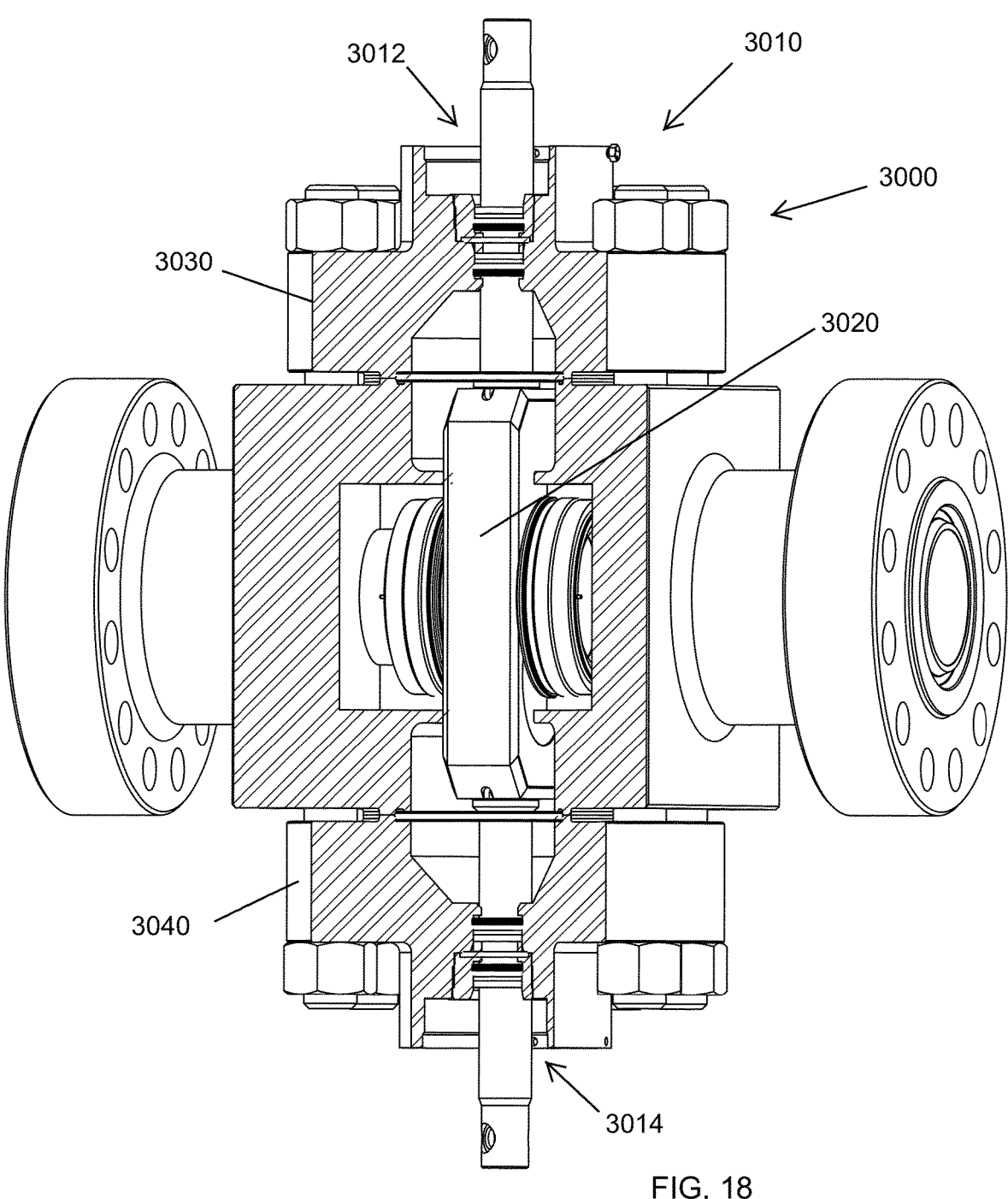
FIG. 18 depicts a side perspective, partial cross-sectional view of a portion of a gate valve that includes various symmetrical features, according to the present disclosure.

In various implementations, the valves that employ a stem connector assembly as depicted and described herein may further comprise various symmetrical features. FIG. 18 depicts a side perspective, cross-sectional view of a portion of a gate valve 3000 that includes various symmetrical features. In an implementation, the valve core assembly 3010 is symmetrical except for the gate 3020. The valve may include uniform, interchangeable bonnets 3030, 3040. The valve 3000 may include identical parts at the top 3012 and bottom 3014 of the valve core assembly 3010. The symmetrical features enable part reduction, easier assembly, overall cost reduction, part uniformity, and/or emergency operations from either end of the valve 3000.

It is to be understood the implementations are not limited to the particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. As another example, "coupling" includes direct and/or indirect coupling of members.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
   installing an operator on a valve in an operational environment without disassembling the valve, wherein installing the operator comprises:
      disposing a valve shaft having a smooth outer surface along its length and an operator shaft having a smooth outer surface along its length in an end to end arrangement;
      positioning a sleeve over the end to end arrangement of the valve shaft and the operator shaft;
      coupling the valve shaft to the operator shaft via the sleeve and a plurality of shear components comprising cylindrical pins that extend through holes in the sleeve, engage the sleeve and extend into corresponding pre-configured recesses in the valve shaft and the operator shaft;
      retaining the plurality of pins in the pre-configured recesses via one or more retaining mechanisms comprising one or more circumferential wraps that engage the pins, wherein each wrap completely surrounds the sleeve, extends into a groove in the sleeve, and extends into grooves along an outer surface of each pin; and
      independently aligning the valve shaft and the operator shaft while transmitting torsional, translational, or torsional and translational loading through the plurality of shear components and not through the retaining mechanisms.

2. The method according to claim 1, wherein a plurality of clearance spaces are created between the sleeve and at least some of the valve shaft, the operator shaft, and the plurality of pins.

3. The method according to claim 2, wherein independently aligning the valve shaft and the operator shaft comprises:
   allowing the sleeve to self adjust between the valve shaft and the operator shaft by moving within at least some of the plurality of clearance spaces.

4. The method according to claim 3, wherein transmitting torsional, translational, or torsional and translational loading through the plurality of pins comprises:
   transmitting torsional, translational, or torsional and translational loading from the valve shaft and the operator shaft through at least one of the plurality of pins as the sleeve self adjusts.

5. A method comprising:
   installing an operator on a valve in an operational environment without disassembling the valve, wherein installing the operator comprises:
      disposing a valve shaft having a smooth outer surface along its length and an operator shaft having a smooth outer surface along its length in an end to end arrangement;
      positioning a sleeve over the end to end arrangement;
      coupling the sleeve to the valve shaft and to the operator shaft via a plurality of fasteners cylindrical pins that extend through holes in the sleeve, engage the sleeve and extend into corresponding pre-configured recesses in the valve shaft and the operator shaft;
      allowing the sleeve to self adjust the alignment between the valve shaft and the operator shaft while transmitting torsional, translational, or torsional and translational loading through the plurality of pins;
      retaining the plurality of pins via one or more circumferential wraps that engage the pins, wherein each wrap completely surrounds the sleeve, extends into a groove in the sleeve, and extends into grooves along an outer surface of each pin;
      wherein the torsional, translational, or torsional and translational loading is not transmitted through the circumferential wraps.

6. The method according to claim 5, wherein a plurality of clearance spaces are created between the sleeve and at least some of the valve shaft, the operator shaft, and the plurality of pins.

7. The method according to claim 6, wherein allowing the sleeve to self adjust the alignment between the valve shaft and the operator shaft comprises:
   allowing the sleeve to move within at least some of the plurality of clearance spaces.

8. A method comprising:
   installing an operator on a valve in an operational environment without disassembling the valve, wherein installing the operator comprises:
      disposing a valve shaft having a smooth outer surface along its length and a operator shaft having a smooth outer surface along its length in an end to end arrangement;
      positioning a sleeve over the end to end arrangement;
      coupling the sleeve to the valve shaft via a first set of fasteners comprising cylindrical shear components that extend through holes in the sleeve and extend into corresponding pre-configured recesses in the valve shaft;
      coupling the sleeve to the operator shaft via a second set of fasteners comprising shear components that extend through holes in the sleeve and extend into corresponding pre-configured recesses in the operator shaft;
      allowing the sleeve to self adjust the alignment between the valve shaft and the operator shaft while transmitting torsional, translational, or torsional and translational loading through the shear components of the first set of fasteners and the second set of fasteners;

retaining the first set of fasteners within the valve shaft via one or more retaining mechanisms comprising one or more circumferential wraps that engage the shear components, wherein each wrap completely surrounds the sleeve, extends into a groove in the sleeve, and extends into grooves along an outer surface of each shear component; and retaining the second set of fasteners within the operator shaft via one or more retaining mechanisms comprising one or more circumferential wraps that engage the shear components, wherein each wrap completely surrounds the sleeve, extends into a groove in the sleeve, and extends into grooves along an outer surface of each shear component;

wherein the torsional, translational, or torsional and translational loading is not transmitted through the retaining mechanisms; and wherein the shear components comprise cylindrical pins.

9. The method according to claim 8, wherein a plurality of clearance spaces are created between the sleeve and at least some of the valve shaft, the operator shaft, the first set of fasteners, and the second set of fasteners.

10. The method according to claim 9, wherein allowing the sleeve to self adjust the alignment between the valve shaft and the operator shaft comprises:

allowing the sleeve to move within at least some of the plurality of clearance spaces.

* * * * *